United States Patent [19]

Kiefl

[11] Patent Number: 5,406,747

[45] Date of Patent: Apr. 18, 1995

[54] DEVICE FOR REGENERATION AND STERILIZATION OF EARTH, SAND OR THE LIKE

[75] Inventor: Rudolf Kiefl, München, Germany

[73] Assignee: Kiefl KB, Gauting, Germany

[21] Appl. No.: 133,260

[22] Filed: Oct. 8, 1993

[30] Foreign Application Priority Data

Oct. 8, 1992 [DE] Germany .................. 9213599 U
Jul. 2, 1993 [EP] European Pat. Off. ........... 93110664

[51] Int. Cl.6 ............................................. A01B 77/00
[52] U.S. Cl. ........................................ 47/1.42; 110/105; 110/110
[58] Field of Search ................. 47/1.42; 110/105, 110

[56] References Cited

U.S. PATENT DOCUMENTS

| | | | |
|---|---|---|---|
| 1,258,912 | 3/1918 | Kinyon | 110/105 |
| 2,563,926 | 8/1951 | Elliott | 47/1.42 |
| 2,602,388 | 7/1952 | Elliott | 47/1.42 |
| 4,009,667 | 3/1977 | Tyer | 110/110 |
| 5,200,033 | 4/1993 | Weitzman | 47/1.42 |

FOREIGN PATENT DOCUMENTS

| | | |
|---|---|---|
| 0277507 | 1/1988 | European Pat. Off. . |
| 1979079 | 2/1968 | Germany . |
| 2349878 | 2/1975 | Germany . |
| 2550142 | 5/1977 | Germany . |
| 2940960 | 6/1980 | Germany . |
| 3809115 | 9/1989 | Germany . |
| 9112202 | 12/1991 | Germany . |
| 4030416 | 4/1992 | Germany . |
| 2136174 | 11/1992 | Germany . |
| 348280 | 9/1960 | Switzerland . |
| 9012602 | 11/1990 | WIPO . |
| 9118672 | 12/1991 | WIPO . |

*Primary Examiner*—Henry E. Raduazo
*Attorney, Agent, or Firm*—Sixbey, Friedman, Leedom & Ferguson; David S. Safran

[57] ABSTRACT

A device for regeneration and sterilization of earth, in particular compost earth, sand, especially playground sand or the like with steam in which a screw conveyor is located in an elongated treatment chamber for continuously moving the material to be treated in the treatment chamber from a feed side to a delivery side of the treatment chamber while mixing it. Further, at least one steam device is provided to introduce steam under pressure into treatment chamber by steam feed orifices along the lengthwise dimension of treatment chamber. Steam feed orifices can be provided in the wall of the treatment chamber. Alternatively or additionally, steam feed orifices can be provided in hollow shaft of the screw conveyor. To make it possible to continuously and automatically feed material into the treatment chamber a filling funnel is provided and steam feed orifices are arranged at a distance from the feed opening of the treatment chamber.

33 Claims, 3 Drawing Sheets

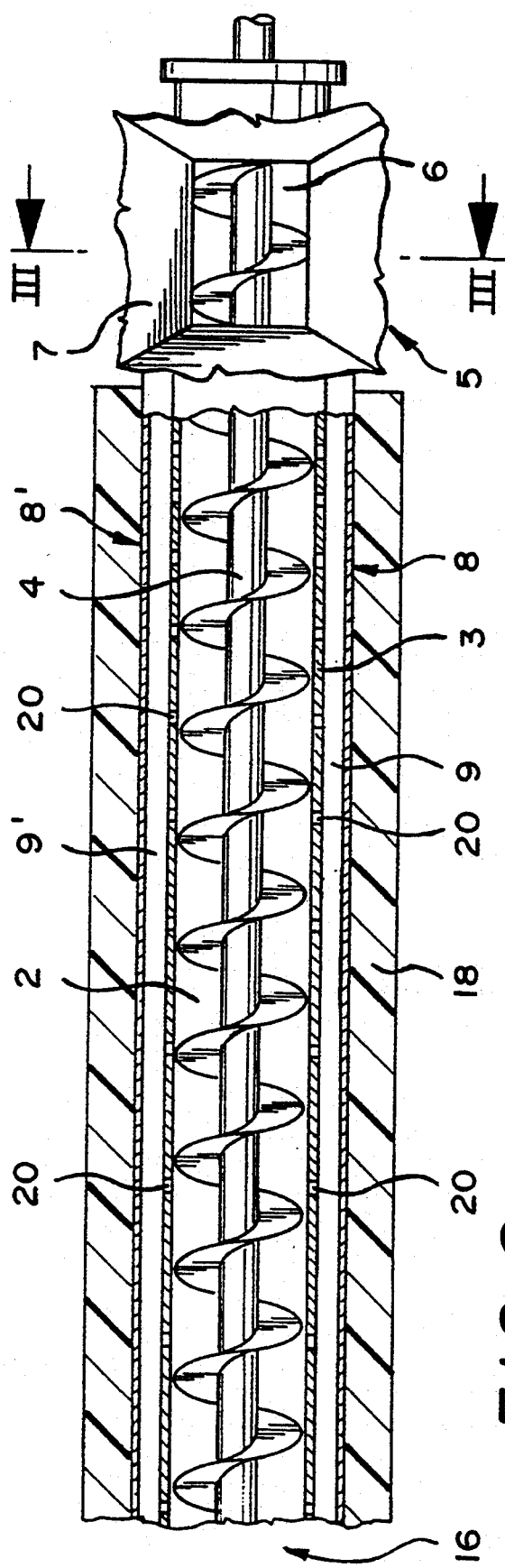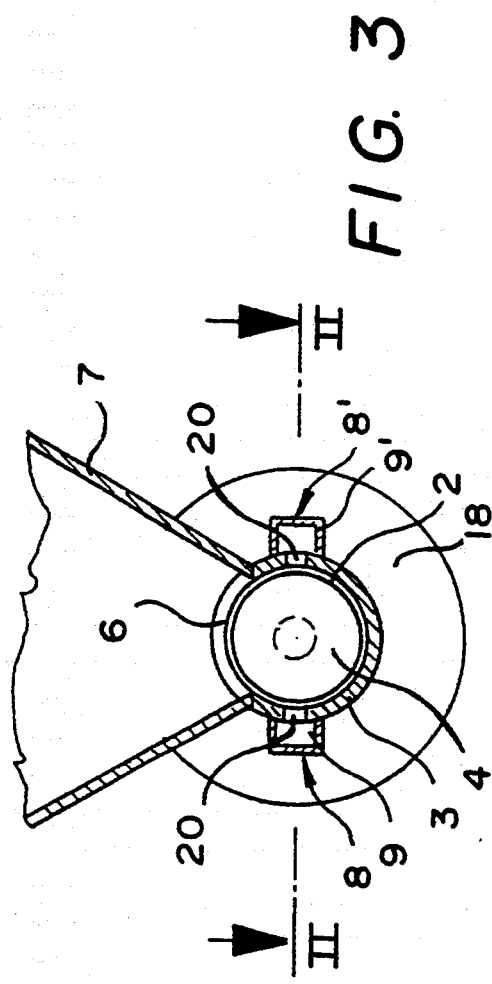

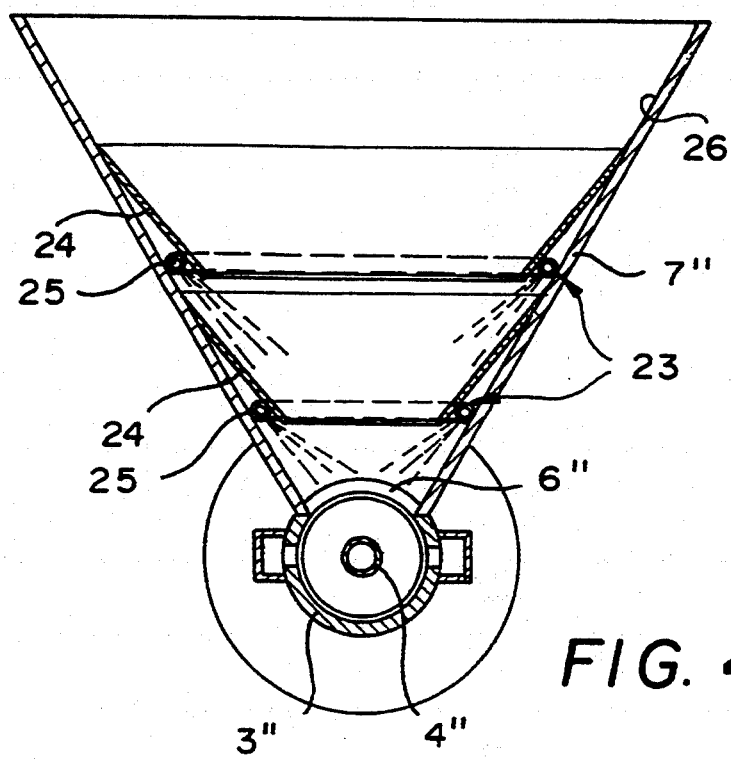
FIG. 4
FIG. 5
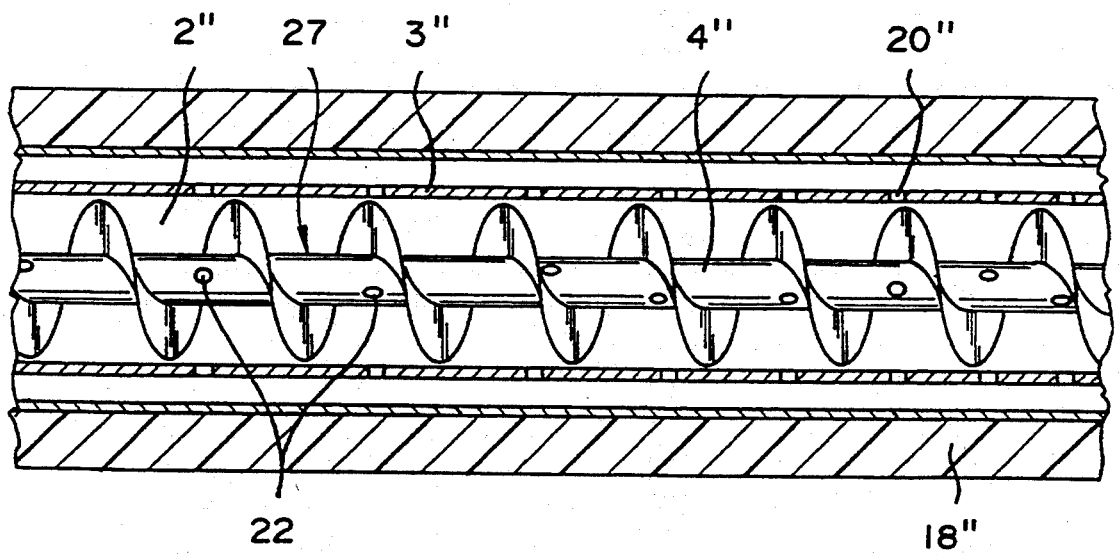

DEVICE FOR REGENERATION AND STERILIZATION OF EARTH, SAND OR THE LIKE

BACKGROUND OF THE INVENTION

The invention relates to a device for regeneration and sterilization of earth, in particular compost earth, sand, especially playground sand or the like, using steam.

Earth, in particular compost earth, sand, especially playground sand or the like, contains, among other things, germs, fungi, microorganisms and the like, so that, for example, such earth cannot be used directly, for example, for plant cultivation and for seedlings. To kill fungi, germs and the like in compost earth, for example, up to now chemical additives have been used, which are no longer permitted to be used. The same or similar holds true also for sand, which, for example at playgrounds, must be regularly regenerated and rid of organisms for health reasons.

Further, for the regeneration of earth, in particular compost earth, there is a device in the form of a rotating drum into whose interior the material to be treated is brought in batches and then, while performing a rolling movement in the drum and with help from loosening devices, steam for sterilization is introduced. Once such a batch is treated, it is removed from the drum and subjected to further processing, and then, the drum must be loaded again with new material to be treated. Such a treatment method is, in particular because of the batch operation, complicated and time-consuming. Further, it has turned out that, with such a treatment method, the material to be treated tends to form clumps, so that, after treatment with steam, retreatment in another treatment step is necessary to loosen up the treated material and eliminate the earth clumps formed.

SUMMARY OF THE INVENTION

Thus, the primary object of the present invention is to provide a device for regeneration and sterilization by steam of earth, in particular compost earth, sand, especially playground sand or the like, that allows treatment in an economical and, in particular, continuous way and, as needed, can be used almost universally, while overcoming the above-described difficulties of the prior art.

According to the invention, this object and others are achieve through preferred embodiments of a device for regeneration and sterilization by steam of earth, in particular compost earth, sand, especially playground sand or the like, having the following characteristics:
 an elongated treatment chamber,
 a screw conveyor placed in the treatment chamber to continuously advance and mix the material brought in to be treated from the feed side to the delivery side of the treatment chamber, and
 a steam device to feed steam under pressure into the treatment chamber by steam feed orifices along its lengthwise dimension.

In the device according to the invention, it has surprisingly turned out that reliable sterilization and regeneration of earth, sand or the like as a material to be treated is achieved continuously by moving the material to be treated through the treatment chamber by a screw conveyor from the feed side to the delivery side, and in doing so, during passage through the treatment chamber, by supplying it with steam by steam feed orifices. The steam goes through the material to be treated in the treatment chamber, so that germs, fungi or the like are reliably killed, and resulting in the earth, sand or the like that continuously exits from the delivery side of the treatment chamber being sterilized by the steam and ready for reuse. The continuous operation of the device according to the invention makes it economically possible to regenerate earth, in particular compost earth, sand or the like, so that it can be available for reuse it at a reasonable price, in particular for gardens and nurseries or public playgrounds.

Preferably, in the device according to the invention, the treatment chamber is arranged at an angle to the horizontal, so that the delivery side is higher than the feed side, and the angle is, for example, in a range from 10° to 60°, preferably in a range from about 20° to 40°, and specifically the angle is about 30°. With this design of the device, the effect of gravity on the material to be treated itself counteracts the conveying movement of the screw conveyor in the treatment chamber, automatically resulting in sufficient mixing and loosening, so that the steam entering the treatment chamber by the steam feed orifices can completely, evenly and reliably penetrate the material to be treated in the treatment chamber, and in this way, simultaneously, clump formations are effectively prevented.

Preferably, in the device according to the invention, the number of steam feed orifices per unit of length in a zone adjacent to the feed side is larger than in the area of the delivery side. This design, thus, results in an intensified steam supply to the material to be treated after it is brought into the treatment chamber, so that, at the beginning of treatment, a larger amount of steam is introduced into the material to be treated than at the end of treatment, i.e., near the delivery side of the treatment chamber, and while the material to be treated is conveyed from the feed side to the delivery side of the treatment chamber, the steam is carried along and thus can effectively act on the material during the conveying and treatment time so that germs, fungi or the like are reliably killed.

According to preferred embodiments of the device, the distance between each two adjacent steam feed orifices in the lengthwise direction of the treatment chamber is smaller in the zone adjacent to the feed side than in the area of the delivery side. Naturally, the varying intensity of the steam supply of the material to be treated can also be achieved in another way, for example, by selecting steam feed orifices of varying size in the associated areas in each case.

In a preferred embodiment according to the invention, the screw conveyor is made as a hollow screw conveyor and the steam feed orifices are provided in the wall surfaces of the hollow screw conveyor. In this embodiment, the steam for regeneration and sterilization of earth is fed by the steam feed orifices fight in the outer wall of the hollow screw conveyor and the steam can then spread from the inside toward the outside in the material to be treated in the treatment chamber.

According to an alternative embodiment according to the invention, the steam feed orifices are provided in the wall of the treatment chamber. With this embodiment, a solid screw conveyor can be used as a conveying screw in the treatment chamber and the steam supply to the material to be treated in the treatment chamber is performed in the preferred direction from the outside toward the inside. Depending on the application, both versions can also be used in combination to treat the material in the treatment chamber, i.e., the hollow screw conveyor has steam feed orifices that act from the inside toward the outside in the treatment chamber while, in the wall of the treatment chamber, other steam feed orifices are provided by which the steam feed is from the outside toward the inside in the treatment chamber.

An especially suitable embodiment of the device according to the invention utilizes a cylindrical treatment chamber made of a pipe, and the steam feed orifices are placed in its surface at diametrically opposite points. The circular cross section of the treatment chamber results in an effective interaction with the screw conveyor placed in it, and in particular dead spaces can be avoided in which untreated material could collect. With this design of the device, operation similar to an extruder is achieved, and the treatment conditions, such as conveying speed and the like, in particular in combination with the design of the screw conveyor and its speed, can be controlled and influenced.

Preferably the steam feed orifice(s) is or are made, in each case, of at least one steam pipe that runs in the lengthwise direction of the treatment chamber and is attached to its outer wall. When the treatment chamber is made of a cylindrical chamber, the steam pipe(s) is or are attached to the outer surface of the pipe of the cylindrical chamber, preferably by screws. In this way, the desired distribution of steam over the lengthwise dimension of the treatment chamber is achieved by a structurally simply designed device.

To be able to adapt the treatment methods and the treatment time in each case to the requirements of the material to be treated, the screw conveyor is preferably connected to be driven by a variable, preferably infinitely variable, drive. In this way, the speed of the screw conveyor, and thus the conveying speed, and in combination with this, the treatment time of the material to be treated in the treatment chamber, can be adapted to the respective requirements. The drive is preferably flange-mounted on the face on the feed-side of the pipe adjacent to the treatment chamber, so that a space-saving construction is achieved. Then, the operating devices for controlling the drive speed of the screw conveyor are also placed at a point that is easily accessible for the operator.

Preferably, the conveying direction of the screw conveyor is oriented in the inclined direction of the treatment chamber, i.e., gravity of the material to be treated in the treatment chamber counteracts the conveying movement, so as to help mix and loosen the material to be treated.

For suitably feeding the device, preferably the material to be treated is brought in on the feed side by a feed orifice in the wall surface of the treatment chamber. To help the entry of the material to be treated, such as compost earth, the feed orifice is preferably surrounded by a funnel-shaped object. This makes it possible, in particular, to continuously feed the device, for example, by conveyor belts.

According to an especially suitable embodiment of the device according to the invention, the filling funnel has, at a distance from the feed orifice, at least one group of steam feed orifices that direct steam toward the feed orifice. With this embodiment, two essential, additional combined effects are achieved. The one effect consists in that, by introducing steam in the area of the filling funnel before feeding the material to be treated by the feed orifice into the treatment chamber, a prewarming and pre-steaming of the material to be treated is performed in the area of the filling funnel so that, for example at the delivery end of the treatment chamber, an 8° to 10° Celsius higher temperature of the treated material can be reached, to achieve a more effective regeneration and sterilization of the earth, sand or the like by steam and without chemical additives. The second effect occurring in combination consists in that, by introducing steam in the filling funnel with the preferred direction toward the feed orifice to the treatment chamber, in the interior of the filling funnel, a partial vacuum, and thus a suction effect, is generated in the filling funnel relative to the outside atmosphere on the top side of the filling funnel, so that the material to be treated introduced by the filling funnel automatically, and without additional manual work, evenly reaches the treatment chamber. Here, it has turned out that the effectiveness of the device and its performance can be improved in this way. Further, this feature makes it possible to continuously feed the treatment chamber with material to be treated, and earth masses or the like that, for example because of moisture, tend to form clumps, can be processed.

Depending on the conditions and the dimensions of the filling funnel, several groups of steam feed orifices can also be provided around the inner wall surface of the filling funnel, and the least number of groups that has proven suitable is two, which are provided at a distance from one another. These steam feed orifices are provided on a conduit that, preferably, goes around the inner wall surface of the filling funnel and to which a suitable steam supply source is connected. This way, a separate steam supply source can be used for the steam feed orifices in the filling funnel or also a common steam supply source can be used for all steam units of the device.

To avoid a clogging of the steam feed orifices in the area of the filling funnel and to guarantee an even descent of the material to be treated in the filling funnel, a cover is associated with each group of steam feed orifices so as cover the steam feed orifices and the encircling conduit for this purpose. Preferably, the cover is slanted like a roof toward the feed orifice to the treatment chamber, so that the descent of the material to be treated toward the feed orifice to the treatment chamber is helped.

To place the device at an angle to the horizontal, preferably a stand supported on the ground or foundation is provided. This stand can make it possible to have an arrangement that is adjustable in height, also while changing the slant angle of the device.

According to a suitable embodiment according to the invention, the device can be moved by an undercarriage, and optionally, by a trailer device, so that the device can simply be brought to the desired site of use in each case. This makes it possible to use the device flexibly and it can, for example, be moved by a pulling vehicle to the desired place of use.

Preferably the steam device(s) has or have a hose connection for a steam supply source that is attached at the intended place of use for steam treatment and steam supply but that can also be taken for other applications.

Preferably, the treatment of the material in the device according to the invention is performed so that the steam temperature in the area of the delivery end is about 90° to 97° Celsius, so that an effective killing of germs during treatment in the device is guaranteed. To achieve as energy saving as possible an operation of the device, and to operate it largely independently of the ambient temperature and other ambient conditions, the treatment chamber is preferably surrounded on the outside by thermal insulation, which can be formed, for example, of a thermal cover, when the treatment chamber is made of a pipe section.

The above-explained details of the device according to the invention are naturally not to be considered as a definitive enumeration, but numerous changes and modifications are possible that one skilled in the art will find if needed without leaving the concept of the invention. In particular, the number of steam devices and their distribution, viewed with respect to the respective size of the treatment chamber, in particular in its diameter, can be selected. Also, in the device according to the invention, depending on the properties of the material to be treated, only a few of the provided steam devices can be used for the steam sterilization of the material in the treatment chamber. Preferably, with the invention, the treated material is delivered at the delivery side by an orifice provided in the wall surface, and the exiting material, thus treated, can be put, for example, on a conveyor belt that then conveys the treated material to the respective place of use. Optionally, below the delivery orifice of the device, a collecting container, for example in the shape of a box, can be placed and the delivery of treated material can then be switched, after filling a collecting container, to another container ready for this purpose. This prevents treated material from coming in contact with untreated material.

By continuous operation of the device, treated material can be produced continuously with increased productivity.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 2 is a longitudinal sectional view of the treatment device taken along section line II—II in FIG. 3;

FIG. 3 is a section view along line III—III in FIG. 2;

FIG. 4 is a sectional view corresponding to that in FIG. 3, but of a modified embodiment of a treatment device; and FIG. 5 is a partial longitudinal sectional view of an another embodiment of a treatment device with a hollow screw conveyor.

DETAILED DESCRIPTION OF THE PREFERRED EMBODIMENT

Figure 1:
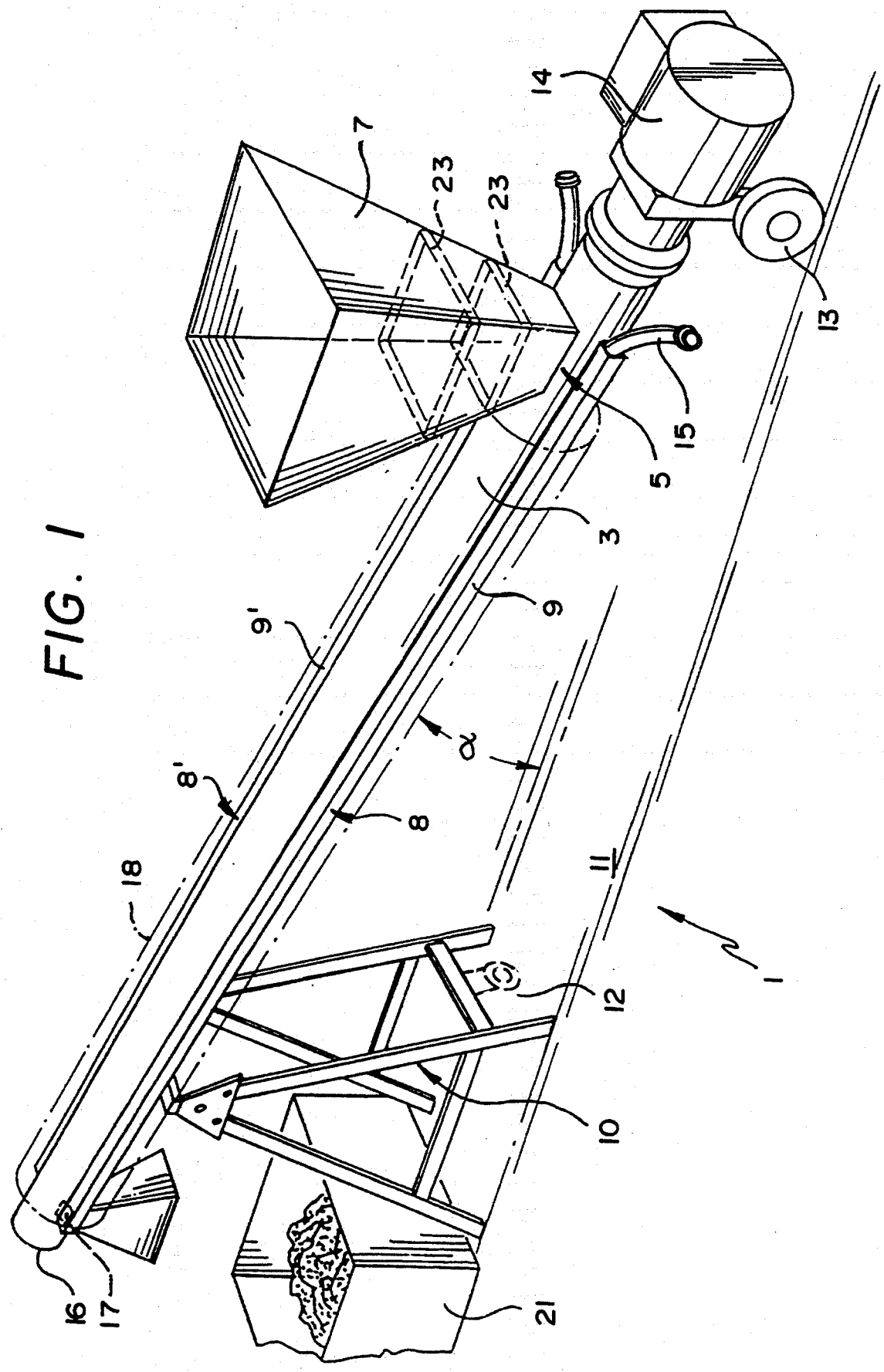
FIG. 1 is a diagrammatic perspective view of an embodiment of a device for regeneration and sterilization of earth, sand or the like according to the invention.

Based on FIGS. 1 to 3, a preferred embodiment of a device, designated overall by 1, for regeneration and sterilization of earth, in particular compost earth, sand, especially playground sand or the like, by steam is explained in more detail. Although the preferred embodiments are explained in connection with the treatment of earth materials, they can also be used for treating other free-flowing materials which can involve, for example, sand, in particular playground sand or the like.

As shown, device 1 has a cylindrical treatment chamber 2 that is formed by a pipe section 3. As can be seen especially from FIG. 2, pipe section 3 has a slightly larger inner diameter than the diameter of a screw conveyor 4 that is placed in treatment chamber 2 and performs, for example, a clockwise turning movement.

At a feed side 5 of treatment chamber 2, a feed opening 6 (see FIG. 2) is provided in the surface of pipe section 3, an opening that is surrounded by a filling funnel 7 to simplify the feeding of device 1 with material to be treated. This feed opening 6 is provided near the end of treatment chamber 2 lying on the right in FIG. 1.

As illustrated in more detail in FIG. 1 in broken lines and in FIG. 4 in a section view, there are installed on an inner wall surface 26 of filling funnel 7, which is provided with reference symbol 7" in FIG. 4 for differentiation purposes, at a distance from feed opening 6" into treatment chamber 2, 2", for example, two encircling conduits 23. These conduits 23 are spaced from one another. There are provided, in each encircling conduit 23, several steam feed orifices 25 that, as indicated in FIG. 4 with broken lines, direct a steam jet toward the feed opening 6" leading to treatment chamber 2, 2". Because of these steam streams produced in the area of filling funnel 7, 7" and aimed this way, a partial vacuum relative to the outer surroundings is generated in the center area of filling funnel 7, 7", in particular near feed opening 6, 6", so that the material to be treated is conveyed with the help of a suction or pulling effect, created this way, toward feed opening 6, 6". Thus, an even and continuous feed to treatment chamber 2, 2" is achieved in combination with filling funnel 7, 7" and the material to be treated automatically descends toward feed opening 6, 6". Additionally, the steam streams by steam feed orifices 25 cause a prewarming and/or a pretreatment of the material to be treated already in the area of filling funnel 7, 7". Here it has turned out that, by this pretreatment and prewarming, 8° to 10° Celsius higher temperatures can be reached at delivery side 16 of treatment chamber 2, 2".

Naturally, more than two or less than two groups of steam feed orifices can be placed one above another inside filling funnel 7, 7".

The same parts, or parts corresponding with the embodiment shown based on FIGS. 1 to 3 are provided in FIG. 4 with the same reference symbols but, for differentiation, with a double prime (").

So as not to impede the descent of material to be treated toward feed opening 6, 6" and treatment chamber 2, 2", and to prevent a clogging of steam feed orifices 25, a cover 24 is provided for each group of steam feed orifices 25 and the encircling conduit 23 associated with them, as represented in FIG. 4. This cover 24 is slanted like a roof toward feed opening 6, 6". Because of this cover 24, steam feed orifices 25 and associated encircling conduit 23 on inner wall surface 26 of filling funnel 7, 7" are protected in an effective way.

In the embodiments shown in the figures, two steam feed devices 8, 8' are fastened, for example by screws, diametrically opposite each other on pipe section 3. Each steam device 8, 8' comprises a steam pipe 9, 9' that extends along the length of treatment chamber 2, i.e., in the direction of the longitudinal axis of pipe section 3. With the help of a stand 10, pipe section 3 is arranged at an angle α relative to a horizontal plane. This angle α can be, for example, about 30°, but it can also be selected to be larger or smaller. When device 1 is used as it is intended, stand 10 is supported on the ground or a foundation 11. As indicated diagrammatically in FIG. 1, stand 10 can be provided with a trailer hitch 12 by which device 1 can be coupled, for example, to the trailer coupling of a pulling vehicle, not shown, when stand 10 is pivoted in a suitable way, for example counterclockwise in FIG. 1, and assumes a horizontal position. To move device 1, a carrying wheel 13 can be provided on the other end of device 1. On the end, lying on the right in FIG. 1, of treatment chamber 2 or of pipe section 3, a drive 14, preferably an infinitely variable drive, with a drive motor, is flange-mounted. Screw conveyor 4 can be driven by drive 14 at a variable speed.

Further, each steam device 8, 8' has a hose connection part 15, 15' to which a steam generator can be connected by a hose conduit (not shown) so as to provide a supply steam which is fed into the interior chamber formed by steam pipe 9, 9'. The end of each steam pipe 9, 9' that faces a delivery side 16 of device 1 is closed. A delivery opening 17 that can be provided, for example, in downwardly facing surface of pipe section 3, is used to discharge the material treated in device 1. This opening can be made slot-shaped.

Further, an insulating jacket 18, indicated with a dot-dash line in FIG. 1, is disposed around the outer surface of treatment chamber 2 or of pipe section 3 to effect a thermal insulation of treatment chamber 2 for energy-conserving reasons during treatment. This insulating jacket 18 can be made of materials known in the art for thermal insulation.

In particular, with reference to FIGS. 2 and 3, in the area of steam device 8, 8', steam feed orifices 20 are provided that penetrate the wall of treatment chamber 2 or of pipe section 3. These steam feed orifices 20 are arranged in a spaced relationship to each other along the length of treatment chamber 2. In the embodiment represented, the design is such that the distance between each pair adjacent steam feed orifices 20, in the area adjacent to feed opening 6 on feed side 5 of device 1, is smaller than that of the orifices 20 in the area near delivery side 16 of device 1. This design results in a more intensive supply of steam to the material to be treated in treatment chamber 2 immediately after entry in treatment chamber 2 than near delivery side 16. The arrangement of steam pipes 9, 9' and respective steam feed orifices 20 diametrically opposite one another results in as complete and even a supply of steam as possible throughout the material to be treated in treatment chamber 2, effectively to kill germs, bacteria, fungi, microorganisms or the like by the action of the steam without chemical means being used for this purpose.

The steam is introduced by steam devices 8, 8' in device 1, for example, at a pressure of about 0.3 to about 0.4 bars, and the temperature of the steam is preferably selected so that the steam temperature in the area of delivery side 16 is still about 90° to 97° Celsius.

As with FIG. 4, the same pans, or parts corresponding with the embodiment shown based on FIGS. 1 to 3 are provided in FIG. 5 with the same reference symbols but distinguished by a double prime (").

Essentially, the distinguishing characteristic of the alternative embodiment according to FIG. 5 is the provision of a hollow screw conveyor 4". This hollow screw conveyor 4" can also be seen in FIG. 4 in cross section. The hollow interior chamber of hollow screw conveyor 4"is connected to a steam supply source that can be provided separately from the treatment device and connected to the end of the screw via a rotary hose coupling. Steam feed orifices 22 are provided in the cylindrically shaped wall 27 of hollow screw conveyor 4". These steam feed orifices 22 can also be distributed, like the above-described steam feed orifices 20, along the length of treatment chamber 2". By these steam feed orifices 22, steam is directed into the material to be treated from the inside toward the outside, i.e., radially toward the wall of pipe section 3" of treatment chamber 2", and by which the material to be treated is regenerated and sterilized.

Depending on the application, it can suffice, to treat the material, to provide, as illustrated in FIG. 5, only one hollow screw conveyor 4" with steam feed orifices 22 in wall surface 27 of hollow screw conveyor 4", while pipe section 3", for example, contrary to the representation of FIG. 5, can be made closed (i.e., orifices 20" can be omitted). But, as illustrated in FIG. 5, steam feed orifices 20" can be provided that essentially correspond to those designated by 20 in the above-described preferred embodiment in addition to orifices 22 in the conveyer screw shaft. By the steam feed orifices 20", steam is supplied into treatment chamber 2, 2" from the outside toward the inside. When both steam feed orifices 20" and 22 are provided, a stronger and more intensive steam treatment can be performed in treatment chamber 2, 2".

Below, the operation and advantages of the above-explained embodiments of device 1 are described in more detail.

Earth to be processed, such as compost earth or the like, is brought in by filling funnel 7, 7", for example with the help of conveyor belts, and it reaches treatment chamber 2, 2", i.e., the interior of pipe section 3, 3". Because of the pulling effect of steam feed orifices 25 in the area of filling funnel 7, 7" (see FIGS. 1 and 4), the earth to be treated is moved evenly and automatically toward feed opening 6, 6". The turning movement of screw conveyor 4, 4" advances the material brought in on feed side 5 into treatment chamber 2, 2" toward delivery side 16 (in FIGS. 1, 2 and 5 from right to left), mixing and loosening the material to be treated. With the help of steam devices 8, 8' and steam feed orifices 20, 20" and/or steam feed orifices 22 in hollow screw conveyor 4", steam is fed into the material to be treated as it is continuously moving along treatment chamber 2, 2", so that germs are effectively killed by sterilization. By passing through treatment chamber 2, 2" from feed side 5 to delivery side 16, the material to be treated is continuously advanced and the steam introduced by steam feed orifices 20, 20" and/or 22 can mix into the material, so that an effective and complete sterilization of the material to be treated is achieved.

The treated material, then, continuously exits at delivery side 16 by delivery opening 17 and can be received, for example, on a conveyor, such as a belt conveyor. The treated earth can then be used, after cooling and aging, for example, for potting seedlings or the like. The continuous operation of device 1 according to the invention makes it possible to achieve an economical steam sterilization of compost earth, for example, so that the latter can be recycled.

Naturally, the device according to the invention is not limited to the above-described details, but numerous changes and modifications are possible without leaving the concept of the invention. In particular, the length of treatment chamber 2, 2" and its diameter and volume can be adapted to the conditions of use in each case and can be suitably selected. Also, the design of screw conveyor 4 or of hollow screw conveyor 4", such as the incline of the screw conveyor and the configuration of the helix shape of the screw conveyor, can be varied.

By simple tests, favorable treatment conditions, in each case, can be established in treatment chamber 2, 2". Also, it possible to match the treatment conditions to the properties of the material to be treated in a universal and simple way, for example, by the infinitely variable drive 14 for the drive of screw conveyor 4, 4". However, it is essential, in device 1 according to the invention, that the material to be treated is treated continuously in device 1 and is moved through treatment chamber 2, 2" and, in doing so, is loosened and mixed so that, at delivery side 16 of device 1, a qualitatively valuable compost earth is obtained that is largely rid of germs, fungi or the like, and thus, can be used as cultivation earth for gardens and nurseries. To make it possible to use device 1 at various places of use in the way it is intended, device 1 can suitably be moved with the help of corresponding devices so that a flexible use of device 1 is made possible. Steam device 8, 8' can also be designed in another way so that it extends, for example, in a spiral shape around the outer periphery of treatment chamber 2, 2" or of pipe section 3, 3". Here, the distances between the windings of such a steam device can be varied from feed side 5 to delivery side 16 to achieve a supply of steam with decreasing intensity in the predetermined way toward delivery side 16.

To avoid contact between sterilized and regenerated material and untreated material, at least one collecting container 21 made, for example, in the form of a box, can be placed under delivery opening 17. This collecting container 21 can then be used to carry away the treated material. Optionally, several collecting containers can be placed next to one another and, after one collecting container 21 is filled, device 1 can be moved or pivoted, for example, so that delivery opening 17 is placed above the next collecting container to be filled.

I claim:

1. Device for regeneration and sterilization of earth and sand type materials with steam comprising:
   A) an elongated treatment chamber having a feed side and a delivery side;
   B) a screw conveyor in said treatment chamber for continuously conveying and mixing of said materials from feed side to delivery side of the treatment chamber: and
   C) at least one steam device for introducing steam under pressure into treatment chamber, said at least one steam device having steam feed orifices spaced along the treatment chamber from said feed side to said delivery side thereof;
   wherein a feed opening for the material to be treated to enter is provided in a wall of the treatment chamber; wherein a filling funnel is provided surrounding the feed opening; and wherein the filling funnel has at least one group of steam feed orifices that direct steam toward the feed opening and which are spaced from the feed opening.

2. Device according to claim 1, wherein said treatment chamber is inclined at an angle relative to a horizontal plane with the delivery side being higher than the feed side.

3. Device according to claim 2, wherein said angle is in a range from 10° to 60°.

4. Device according to claim 2, wherein said angle is in a range from 20° to 40°.

5. Device according to claim 2, wherein said angle is about 30°.

6. Device according to claim 1, wherein the screw conveyor has a conveyor screw with a hollow screw shaft; and wherein steam feed orifices are provided in a wall surface of the hollow screw shaft.

7. Device according to claim 6, wherein the steam feed orifices are provided in a wall of the treatment chamber.

8. Device according to claim 7, wherein at least two steam devices are provided on approximately opposite wall parts of the treatment chamber.

9. Device according to claim 7, wherein the treatment chamber is a cylindrical space formed by a pipe and the steam feed orifices are located at diametrically opposite points on the pipe.

10. Device according to claim 9, wherein each of the steam devices comprises a steam pipe that runs in the lengthwise direction of treatment chamber and is attached to its outer wall.

11. Device according to claim 6, wherein the screw conveyor is connected to a variable speed drive.

12. Device according to claim 1, wherein the screw conveyor is connected to a variable speed drive.

13. Device according to claim 12, wherein the treatment chamber is a cylindrical space formed by a pipe; and wherein the drive is flange-mounted on a feed-side end of pipe adjacent to the treatment chamber.

14. Device according to claim 2, wherein the screw conveyor has a conveying direction that is oriented in the inclined angle of the treatment chamber.

15. Device according to claim 2, wherein a stand is provided for supporting the treatment chamber relative to the horizontal plane.

16. Device according to claim 15, wherein the device is movably supported by an undercarriage.

17. Device according to claim 1, wherein said at least one steam device has a hose connection for a steam supply source.

18. Device according to claim 1, wherein the treatment chamber is externally surrounded by thermal insulation.

19. Device according to claim 1, wherein at least one group of steam feed orifices are arranged around an inner wall surface of the filling funnel.

20. Device according to claim 19, wherein at least two groups of steam feed orifices are provided which are located at a distance from one another.

21. Device according to claim 20, wherein each group of steam feed orifices is provided with a cover that covers the steam feed orifices and an associated, encircling conduit.

22. Device according to claim 21, wherein said cover is slanted toward the feed opening.

23. Device according to claim 1, wherein a delivery opening is provided in a wall of the treatment chamber at the delivery side.

24. Device for regeneration and sterilization of earth and sand type materials with steam comprising:
   A) an elongated treatment chamber having a feed side and a delivery side;
   B) a screw conveyor in said treatment chamber for continuously conveying and mixing of said materials from feed side to delivery side of the treatment chamber; and
   C) at least one steam device for introducing steam under pressure into treatment chamber, said at least one steam device having steam feed orifices spaced along the treatment chamber from said feed side to said delivery side thereof, wherein the number of steam feed orifices per unit of length of the treatment chamber is larger in a zone adjacent to the feed side than in an area of the delivery side.

25. Device according to claim 24, wherein the distance between each two adjacent steam feed orifices in the lengthwise direction of treatment chamber in the zone adjacent to feed side is smaller than in the area of delivery side.

26. Device according to claim 6, wherein a feed opening for the material to be treated to enter is provided in a wall of the treatment chamber at the feed side.

27. Device according to claim 26, wherein a filling funnel is provided surrounding the feed opening.

28. Device according to claim 27, wherein the filling funnel has at least one group of steam feed orifices that direct steam toward feed opening and which are spaced from the feed opening.

29. Device according to claim 28, wherein at least the one group of steam feed orifices are arranged around an inner wall surface of the filling funnel.

30. Device according to claim 29, wherein at least two groups of steam feed orifices are provided which are located at a distance from one another.

31. Device according to claim 30, wherein each group of steam feed orifices is provided with a cover that covers the steam feed orifices and an associated, encircling conduit.

32. Device according to claim 31, wherein said cover is slanted toward the feed opening.

33. Device according to claim 26, wherein a delivery opening is provided in a wall of the treatment chamber at the delivery side.

* * * * *